(12) United States Patent
Tummuru et al.

(10) Patent No.: US 11,170,346 B2
(45) Date of Patent: Nov. 9, 2021

(54) DECENTRALIZED CREDENTIALS VERIFICATION NETWORK

(71) Applicant: SAP SE, Walldorf (DE)

(72) Inventors: Nethaji Tummuru, Sunnyvale, CA (US); Surbhi Sheth-Shah, Los Altos, CA (US); Michael Kunzmann, Palo Alto, CA (US); Sanjay Shirole, Palo Alto, CA (US); Jun Meng, Menlo Park, CA (US)

(73) Assignee: SAP SE, Walldorf (DE)

( * ) Notice: Subject to any disclaimer, the term of this patent is extended or adjusted under 35 U.S.C. 154(b) by 1033 days.

(21) Appl. No.: 15/385,479

(22) Filed: Dec. 20, 2016

(65) Prior Publication Data

US 2018/0082256 A1 Mar. 22, 2018

Related U.S. Application Data

(60) Provisional application No. 62/396,727, filed on Sep. 19, 2016.

(51) Int. Cl.
*G06Q 10/10* (2012.01)
*H04L 9/32* (2006.01)

(52) U.S. Cl.
CPC ....... *G06Q 10/1053* (2013.01); *H04L 9/3236* (2013.01); *H04L 9/3297* (2013.01); *H04L 2209/38* (2013.01)

(58) Field of Classification Search
CPC .............. G06Q 20/341; G06Q 10/1053; H04L 9/3236; H04L 9/3297; H04L 2209/38
USPC ........................................................ 705/50
See application file for complete search history.

(56) References Cited

U.S. PATENT DOCUMENTS

| 2017/0132621 | A1* | 5/2017 | Miller |
| 2017/0317833 | A1* | 11/2017 | Smith et al. |
| 2018/0174255 | A1* | 6/2018 | Hunn et al. |
| 2019/0013943 | A1* | 1/2019 | Maim |

(Continued)

OTHER PUBLICATIONS

2016, Provisional Application of Smith (US20170317833A1).*
2016, Provisional Application of Hunn (US20180174255A1).*

*Primary Examiner* — James D Nigh
*Assistant Examiner* — Yin Y Choi
(74) *Attorney, Agent, or Firm* — Fountainhead Law Group P.C.

(57) ABSTRACT

A credentials verification network utilizes blockchain technology to track/verify credentials for candidates that can later be used in the hiring verification process. As implemented by nodes of a distributed network, a candidate receives from a first network node a secure credential generated by a credentialing source from an original credential document. The first node processes the secure credential according to a security feature (e.g., hash function) to create a transaction, and assigns an identifier to the transaction. The first node signs the transaction with a private key to create a transaction signature. The first node sends the signed transaction to a central server that broadcasts the transaction to the blockchain network. Once the network has accepted the transaction, the candidate will be notified and handed over the raw text document and transaction receipt ID. The candidate can forward the information to a recruiter or potential employer running a second node.

20 Claims, 15 Drawing Sheets

(56) References Cited

U.S. PATENT DOCUMENTS

2019/0095909 A1\* 3/2019 Wright
2020/0234386 A1\* 7/2020 Blackman et al.

\* cited by examiner

TrueRec Profile

NAME: Martha T
DOB: 12/04/1990

| VERIFICATION ID | INSTITUTION | FILE NAME |
|---|---|---|
| EX52TC2084 | Stanford University | Certificate |
| SP4XN405PT | BMW | Employment |
| Q255DX1W5 | UC Berkeley | Certificate |

DECENTRALIZED CREDENTIALS VERIFICATION NETWORK

CROSS-REFERENCE TO RELATED APPLICATION

The instant nonprovisional patent application claims priority to U.S. Provisional Patent Application No. 62/396,727, filed Sep. 19, 2016 and incorporated by reference in its entirety herein for all purposes.

TECHNICAL FIELD

The embodiments described in this disclosure relate generally to processing and storing verified credentials information in a decentralized network using blockchain technology.

BACKGROUND

Unless otherwise indicated herein, the approaches described in this section are not prior art to the claims in this application and are not admitted to be prior art by inclusion in this section.

There are many mechanisms that recruiters and/or hiring managers and companies can leverage to check the credentials and background of prospective candidates before making hiring decisions. In a typical process, background checks are performed after an offer is extended to a candidate. Several categories of background checks may be performed including identity checks, credit history checks, criminal background checks, and education and employment experience checks.

But the current process for verifying a candidate's credentials can be very time-consuming, redundant, and expensive. In a typical case, employers can go through as many as seven steps to complete an education and employment experience background check for a prospective employee. These seven steps may include: (1) receiving an application; (2) conducting an initial screening; (3) judging the candidate on additional qualification metrics; (4) making an offer; (5) conducting internal verification; (6) conducting additional verifications through third-party agencies; and (7) repeating these various for any background mismatches that may be uncovered in the process. This process can take up to three weeks or more to complete for an individual hire. Not only is this process inefficient, and financially costly, but it may also increase the chances of losing the best candidates to competitor companies based on the time delay.

Information provided by candidates can also raise issues of trustworthiness because much of the information included in a candidate's resume or professional social media profile is self-reported. Some job applicants tend to over-exaggerate their experience, omit certain details, or provide inaccurate or misleading information.

Many recruiters and hiring managers employ third-party agencies to verify a candidate's claims in a resume. For example, third-party agencies may be hired to confirm a candidate graduated from the institutions listed in their resume. Recruiters may also call a candidate's references or ask for employment verification certificates from their previous employers to verify whether the candidate worked at the companies listed on their resume. Employers may spend $150-$250 on average for each employee hired, and each background check can take three days (within the US) and up to three weeks (international) on average.

SUMMARY

The embodiments described in this disclosure include an improved credentials verification network that utilizes blockchain technology to track and verify credentials for candidates that can later be used in the hiring verification process. As implemented by a distributed network, a candidate receives from a first network node (e.g., of a school or past employer) a secure credential generated by a credentialing source from an original credential document (e.g., academic transcript or job performance record). The first node processes the secure credential according to a security feature to create a transaction, and assigns an identifier to the transaction. Particular embodiments may employ a hash function in order to not store the raw text information but to store instead a fingerprint of the information. The first node signs the transaction with a private key in order to create a transaction signature. The first node sends the signed transaction, including the transaction signature, to a central server that broadcasts the transaction to the blockchain network. Once the network has accepted the transaction (e.g., through mining or other consensus mechanism such as proof of work, the candidate will be notified and given the raw text document and transaction receipt id. The candidate can now forward this information to a recruiter or potential employer running a second node on the network. The second node will regenerate the fingerprint of the document and lookup the fingerprint stored in the blockchain network, using the transaction receipt identifier.

An embodiment of a computer-implemented method comprises receiving a secure credential generated from an original credential document, and processing the secure credential according to a security feature to create a transaction. The transaction is signed with a key to create a transaction signature, and the transaction and transaction signature are communicated for storage as a block in a blockchain.

A non-transitory computer readable storage medium embodies a computer program for performing a method comprising receiving a secure credential generated from an original credential document comprising an academic transcript or an employment record. The secure credential is processed according to a security feature to create a transaction. The transaction is signed with a key to create a transaction signature. The transaction and the transaction signature are communicated for storage as a block in a blockchain.

An embodiment of a computer system comprises one or more processors and a software program executable on said computer system. The software program is configured to cause a distributed network node to receive a secure credential generated from an original credential document, and to compile source code to produce a contract term. The software program is further configured to process the secure credential according to a security feature to create a transaction including the contract term, and sign the transaction with a key to create a transaction signature. The transaction and the transaction signature are communicated for storage as a block in a blockchain recognizing the contract term.

In certain embodiments the security feature comprises a hash function and the secure credential is generated by processing the original credential document with the hash function.

According to some embodiments the transaction comprises a contract term.

In particular embodiments the contract term is compiled from source code.

According to various embodiments the contract term comprises a revocation.

In certain embodiments the transaction comprises a hash of an assigned identifier.

In some embodiments the secure credential is provided based upon recognition of a user identifier by a pre-existing application.

According to specific embodiments the secure credential is provided in a format dictated by the user identifier.

In some embodiments the format comprises JavaScript Object Notation (JSON).

Particular embodiments further comprise storing the original credential document.

In various embodiments the original credential document comprises an academic transcript or an employment record.

The following detailed description and accompanying drawings provide a better understanding of the nature and advantages of embodiments.

BRIEF DESCRIPTION OF THE DRAWINGS

For a better understanding of the embodiments described in this disclosure, reference is made to the following detailed description, which is to be read in conjunction with the accompanying drawings.

DETAILED DESCRIPTION

Figure 1:
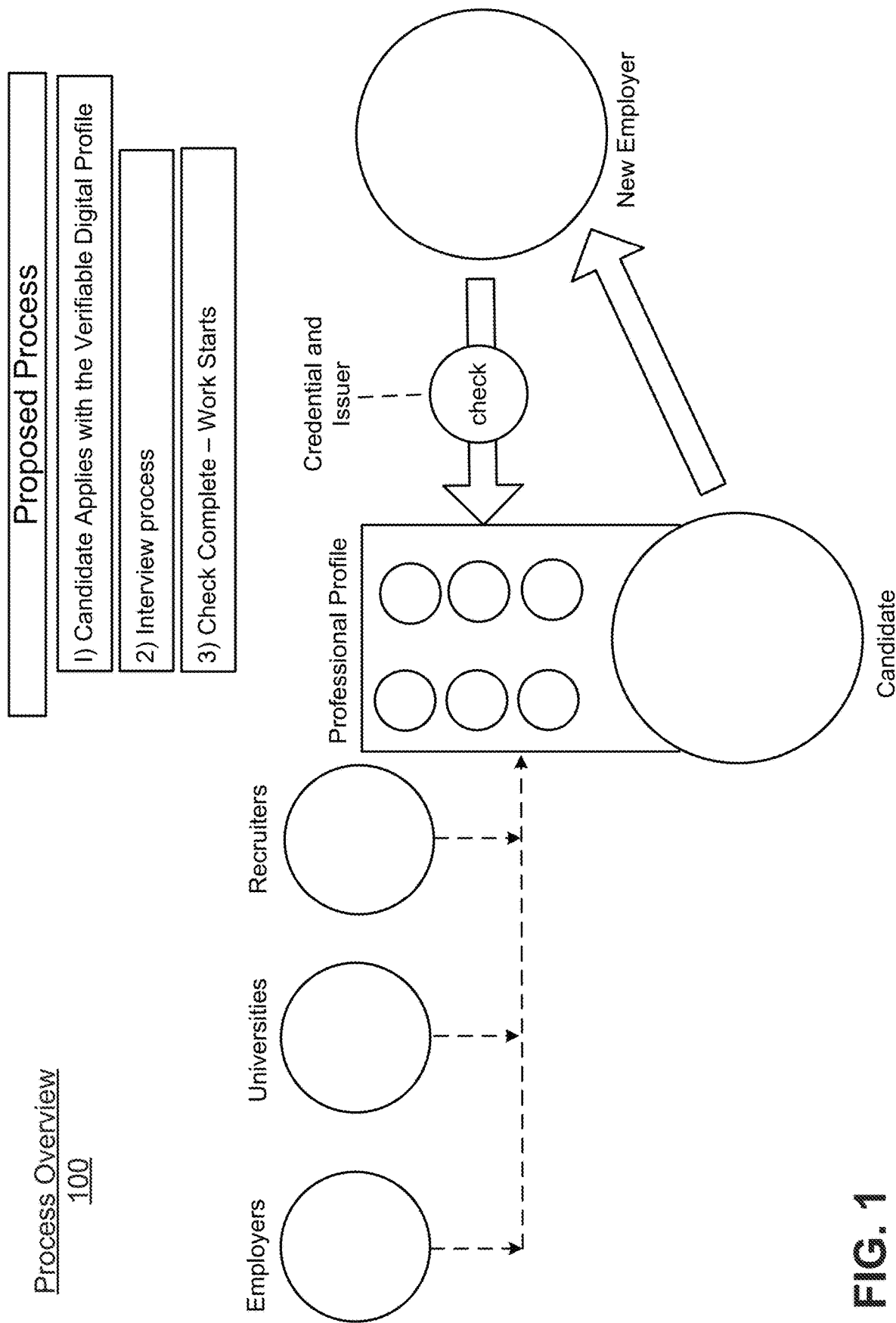
FIG. 1 depicts a conceptual process overview block diagram of an example embodiment of a decentralized credentials verification network in accordance with at least certain techniques described in this disclosure.

Throughout the description, for the purposes of explanation, numerous specific details are set forth in order to provide a thorough understanding of the present disclosure. It will be apparent to one skilled in the art, however, that the techniques described in this disclosure may be practiced without some of these specific details. In other instances, well-known structures and devices may be shown in block diagram form to avoid obscuring the underlying principles of the techniques described in this disclosure.

The disclosed embodiments provide for improved methods, systems and computer readable media adapted to provide an improved decentralized credentials verification network that leverages blockchain technology to significantly improve user experience by providing trustworthiness of job applicants' professional records, as well as significantly reducing both financial and time costs. In one embodiment, the decentralized credential verification network configured according to the techniques described in this disclosure can be adapted to provide authenticity, which can also significantly simplify the process. The solutions presented herein can be configured to leverage decentralization and crypto-technology in order to store each user's credentials, experience, and background in a way that is safe, reliable, and trustworthy.

In one embodiment, trustworthiness can be implemented using a feature of blockchain technology in which each entity of record information in the network can be provided directly by the relevant party (school, company, etc.) so that the entire records for each user can be collectively owned by and stored in the decentralized network. Using blockchain technology in the recruiting process can significantly increase the trustworthiness in employee records, as well as improve efficiency of the work flow.

Blockchain technology is configured to communicate using a peer-to-peer (P2P) network. A P2P network includes a distributed implementation where each party is associated with a different node on the network that has the same capabilities and any party can initiate communications. Unlike a client-server implementation in which the client makes a service request and a server fulfills the request, in P2P networks each user is associated with a node in the network that can function as both a client and a server.

A blockchain can be thought of as a public digital collection of information of a particular type that can be configured to record transactions as they occur in a particular network. In this manner, blockchain acts like a distributed database that maintains a continuously growing list of records secured from revision or tampering. Each blockchain record may include a timestamp and a link to a previous block in the blockchain. In embodiments, the blockchain may serve as a public digital collection of transactions relating to a user's identity, education and employment experience, professional certificates, peer-to-peer certificates etc. Users can connect to the distributed network for the purpose of sending new transactions, storing transactions, verifying transactions, and creating additional new blocks of transactions.

For security, each block in the chain may include a hash (or other encryption feature) of the prior block in the block chain linking the blocks together, and the linked blocks form a chain. In addition to a secure hash-based history, any blockchain database may have a specified algorithm for scoring different versions of the transaction history so that entries with a higher value (i.e. the longest chain) can be selected over others. Peers in the decentralized network supporting a blockchain database generally do not have the exact same version of the history at all times stored on their local machines. Instead, the peers maintain the highest scoring version of the database that they are currently aware of. Whenever a peer receives a higher scoring version (usually the old version with a single new block added) they extend or overwrite their own database and re-transmit the update to their peers in the network. Every node in the distributed network may store a copy of the blockchain. In such a network, there is no centralized official copy of the blockchain and no user is trusted more than any other user. Transactions may be broadcast into the network using various software applications. During operation, mining nodes validate transactions, add them back to the block they are creating, and then broadcast the completed block to other nodes on the network.

By adopting the techniques described in this disclosure, the above seven recruiting steps can be condensed to only two steps including (1) receiving an application with the candidate's verifiable digital profile and (2) conducting an interview process. In such cases, reliance upon third-party agencies for conducting aspects of a background check can be significantly reduced or eliminated. Also, the process embodiments presented in this solution can be performed much quicker and more efficiently than previous solutions because verification can take place locally on any of the participating nodes in the decentralized network and does not require a centralized node.

As used in this disclosure, the term "decentralized network" or "decentralized computer network" may refer to a network that does not have a central server. Such a decentralized network may be configured as a computer network in which control functions are distributed over several nodes as opposed to a centralized network in which nodes in the network are connected to a single node or server where the participating nodes are referred to as client nodes or clients. In at least certain embodiments, blockchain can be implemented as both a decentralized and distributed network, decentralized in the sense that there is no node in the network that acts as the central server for the network. Responsibilities are shared by the nodes; and distributed in the sense that nodes are typically aware of other nodes in the network and how to connect with them.

In one embodiment, the credentials verification network can be configured to store candidates' academic, employment, and professional credentials on the various nodes of the network. These details become professional profiles on the blockchain. The user profiles can then be submitted to any prospective employer or agency who wants to verify a candidate's credentials. In at least certain embodiments, this verification can be done in real time. Nodes on the network can issue and verify the credentials for any user on the network. For example, a university can issue verified student transcripts, an employer can issue verified employment/skill/title/performance review records, and an individual such as a former supervisor, peer, or subordinate can issue a verified certification. Such information may be stored on the decentralized network in the blockchain.

In one embodiment, when an entity decides to verify credentials using the decentralized/distributed network described in this disclosure, the hashed content of credentials documents can be published to the blockchain network.

In addition, the original (e.g., non-hashed) credentials documents can be issued to the candidate in digital format through a secure communications channel. In at least certain embodiments, this can be accomplished seamlessly to the issuer. When a candidate wishes to submit verified credentials to any entity, he or she can present credentials and these credentials can be compared against the same on the blockchain network.

In this manner, embodiments described in this disclosure may function as a safe keeper of candidate records from academic institutions and employers, etc. Compared with a centralized database record keeping method of prior solutions, the disclosed techniques can enable many more parties to be involved in verifying credentials information for job applicants. And once implemented, employers and hiring agencies will no longer have to repeat the current processes of employment and education verification. They could even run the check at the resume screening stage, instead of having to wait until after an offer is extended. In addition, these techniques can also provide convenience to candidates since they can simply disclose their professional background to the employers via the decentralized blockchain network instead of going through the process of sending out resumes or manually filling out online forms. It should be noted that this process can be used not just for employment purposes, but for any purpose where employment and academic credentials have to be verified, such as for example for university enrollment or for checking employment records for financial institutions, etc.

In one embodiment, organizations and institutions can directly publish credentials information to the decentralized network. For example, upon graduating from a particular university, such as the University of California, Los Angeles ("UCLA"), that university can publish graduation diplomas and other credentials onto the network to be accessed by any peer user connected to the network. And because this information was directly published by UCLA, it is verified without having to go check for further verifications from third-party agencies. Once this record is in the blockchain, it includes authentic information because it is issued directly from UCLA.

As another example, every time a company has a change in employment for a particular employee, that company can publish and update of the employee's employment information onto the blockchain, and this information can be shared among the peer nodes connected to the network in accordance with the techniques described in this disclosure. Each entity utilizing the verification network can be equipped with the functionality to publish onto the network.

On the other end of this network are the individual candidates. At least certain embodiments provide a centralized server node for the individual candidate users on the network. This centralized candidate node can be utilized to provide, for example, a mobile application for individual users to access the network. In other words, at least certain embodiments of the network solution described herein can be configured as a hybrid P2P network where each entity (e.g., institution, organization, university, corporation, etc.) comprises a separate node in the network, and where a centralized node can be provided to service the individual candidates on the network. This separate candidate node can be equal to other nodes in the network. In this respect, embodiments of the network can be implemented as a hybrid P2P network.

Another benefit of the distributed network described in this disclosure is that each party can log their own information onto the blockchain, and parties do not need to trust each other in order to verify the information on the network. This is because parties log their own information in the blockchain, and the network is used to verify this information. Parties have access to the same information in the blockchain. The blockchain can log transactions between user nodes on the network.

In one embodiment, document fingerprints can be stored in the blockchain instead of storing the documents themselves on the network. The documents themselves remain stored on the local machines of users. This can be advantageous for performance and data storage reasons. The transactions can be verified based on the document fingerprints (for example, a hash) for the transactions in the blockchain instead of verifying the documents themselves on the network. The techniques described herein also provide users with control over what data is shared in the network.

In one embodiment, the processes described in this disclosure may be implemented using a push mechanism. For example, a person graduating from UCLA may receive an email (or other electronic notification) notifying the user that his or her degree or certification has been published to the credentials verification network. The electronic communication may also offer the person an opportunity to register for an account with the network. When the person registers, he or she will be provided with an account on the verification network and will have the corresponding services provided by the central user node in the network in accordance with the techniques described in this disclosure.

Consider the example where the person from UCLA went on to work at FACEBOOK for a period of time after graduating and then transferred to GOOGLE. Both FACEBOOK and GOOGLE can publish this employment information onto the network confirming that the person worked at those companies, and this information can be stored in the blockchain associated with that person. In one embodiment, this can be done because the entries in the blockchain include an actual certificate as well as a private key. If this person subsequently applies for a new job with a new company, and supplies a resume to the credentials verification network, then the future employer can check the experiences listed on the person's resume with the information in the blockchain for verification.

On the employer side, the resume can be verified from the very beginning when the person's resume is being screened. If every entry in a candidate's resume is verified via the blockchain, then when an offer is extended to a particular candidate the verification can already have been performed, and there may be no need to go out and hire third-party agencies to perform further verification of the information. The candidate could even start working on the same day when the offer is extended.

In another embodiment, the processes described in this disclosure may be implemented using a pull mechanism. For example, a candidate can request via the network that a particular institution publish the certificate or other credential onto the verification network. The institution can then publish the credential onto the network and it can be stored as a unique transaction in the blockchain with a timestamp. This technique can also be useful when not all experiences are certified on provided resume.

I. Illustrative Systems and Processes

Provided below is a description of example systems upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in decentralized computing environments where operations are performed by remote data processing devices or systems that are linked through one or more wired or wireless networks.

Further, it is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

FIG. 1 depicts a conceptual process overview block diagram of an example embodiment of a decentralized credentials verification network in accordance with at least certain techniques described in this disclosure. In the illustrated embodiment, process overview 100 includes three operations in the proposed process (1) the candidate applies with a verifiable digital profile, (2) the interview process is conducted, and (3) since the verification check has already been completed, work can start immediately upon extending an offer to the candidate. As shown in number of entities, including employers, universities, and recruiters, contribute to the professional profile of the candidate by publishing his or her credentials onto the network. New employers can then access the network to obtain verification of employment and other credentials information.

Figure 2:
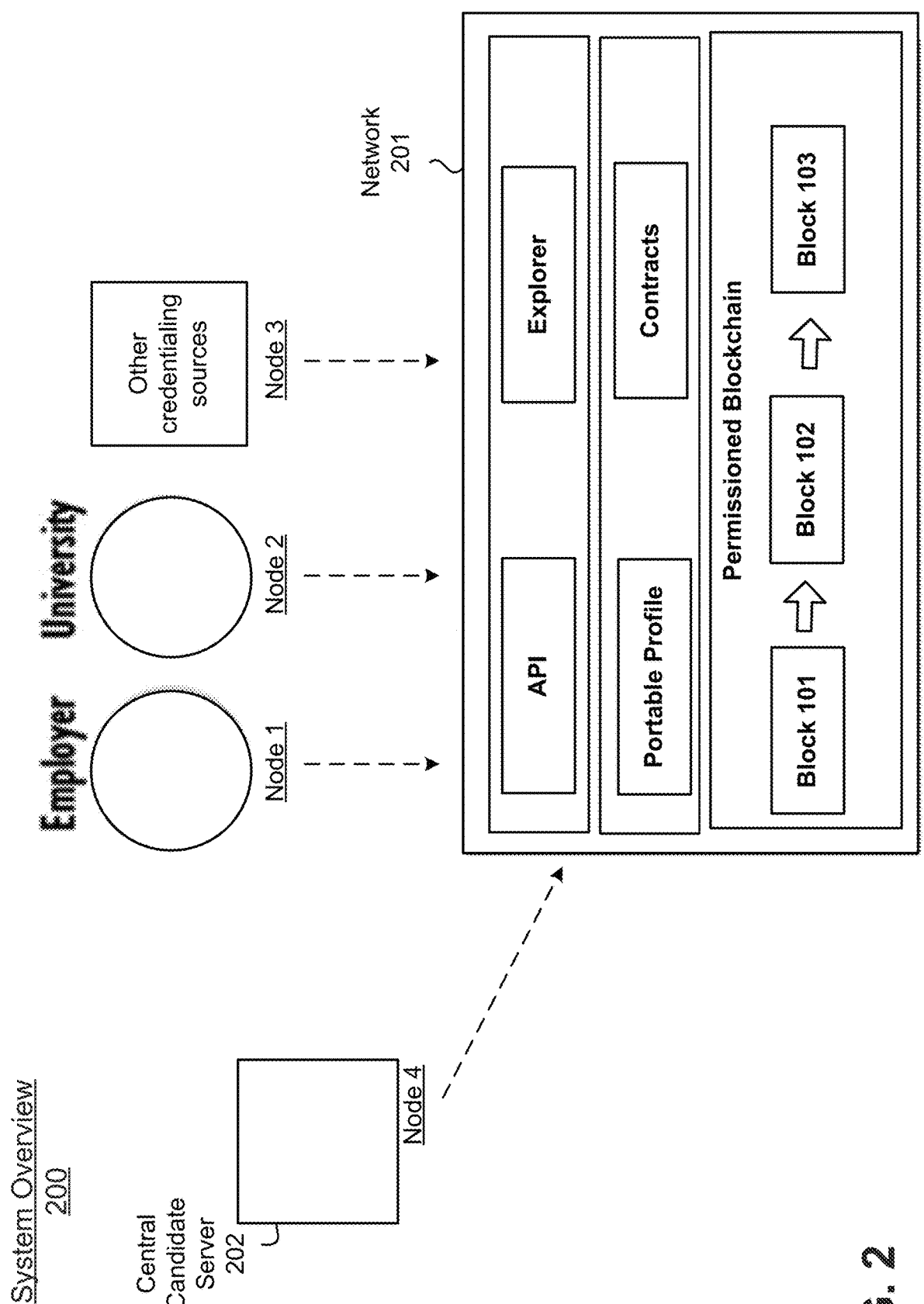
FIG. 2 depicts a conceptual overview block diagram of an example embodiment of a credentials verification network system in accordance with at least certain techniques described in this disclosure.

FIG. 2 depicts a conceptual block diagram of an example embodiment of a credentials verification system overview in accordance with at least certain techniques described in this disclosure. In the illustrated embodiment, system overview 200 shows some basic components for the network 201. Each entity on the network 201, including employers, universities, and other credentialing sources, can each be located on a separate node of the distributed network 201. As shown, the employer is on node 1, the university is on node 2, and the other credential source is on node 3. In addition, the central candidate server 202 can be located on a centralized node 4 and can be configured to facilitate users registering onto the network and receiving services from the network via the centralized user node 4.

Each of these entities and/or candidate users can access the network 201 via one or more communication networks or links. In the illustrated embodiment, the network 201 includes (1) an API (or other equivalent interface) that may be configured for communicating with the nodes on the network 201, (2) an explorer unit that may be configured to search for items in the network 201, (3) a portable profile component that may be configured to access user profiles on the network 201, and (4) one or more contracts stored in the network. The network 201 further comprises a permissioned blockchain, which can be used to track employee profiles on the network 201 as described above. As shown, the permissioned blockchain includes several blocks (block 101, 102 and 103) in the chain, as well as the links between the blocks. In one embodiment, the links between the blocks may be implemented using a hash function security feature as above.

Figure 3:
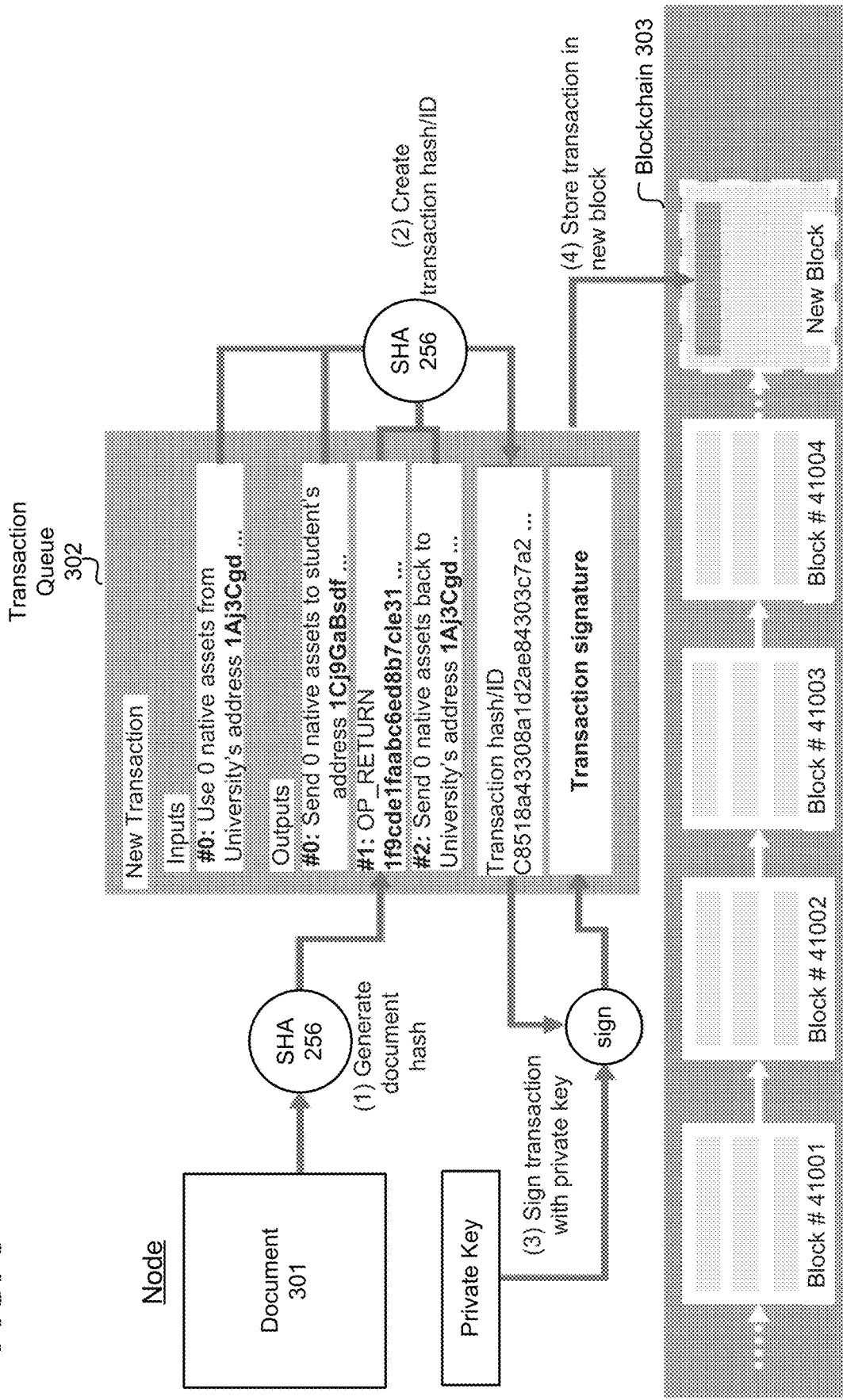
FIG. 3 depicts a conceptual block diagram of an example embodiment of a high-level architecture for a decentralized credentials verification network in accordance with at least certain techniques described in this disclosure.

FIG. 3 depicts a conceptual block diagram of an example embodiment of a high-level architecture/process for a decentralized credentials verification network utilizing a blockchain in accordance with at least certain techniques described in this disclosure. In the illustrated embodiment, the process begins when a document 301 (e.g., resume, certificate or other credentials or employment information) is published onto the network. The transaction can be stored into the blockchain 303 as a new transaction. As shown, the blockchain 303 includes a number of blocks 41001, 41002, 41003, 40004, as well as links between the blocks.

In operation, a secure hash algorithm ("SHA") 256 is first performed on the document 301 to generate a secure hash of the document 301. This secure hash is placed into a transaction queue 302. In a second operation, the process can be configured to create a transaction hash identifier (hash/ID) for the document 301, which can then be signed with a private key of the node/user (operation 3). In a fourth operation of the illustrated embodiment, the transaction signature can then be stored into a new block of the blockchain 303 and linked together with the previous block in the chain as described above.

Figure 4:
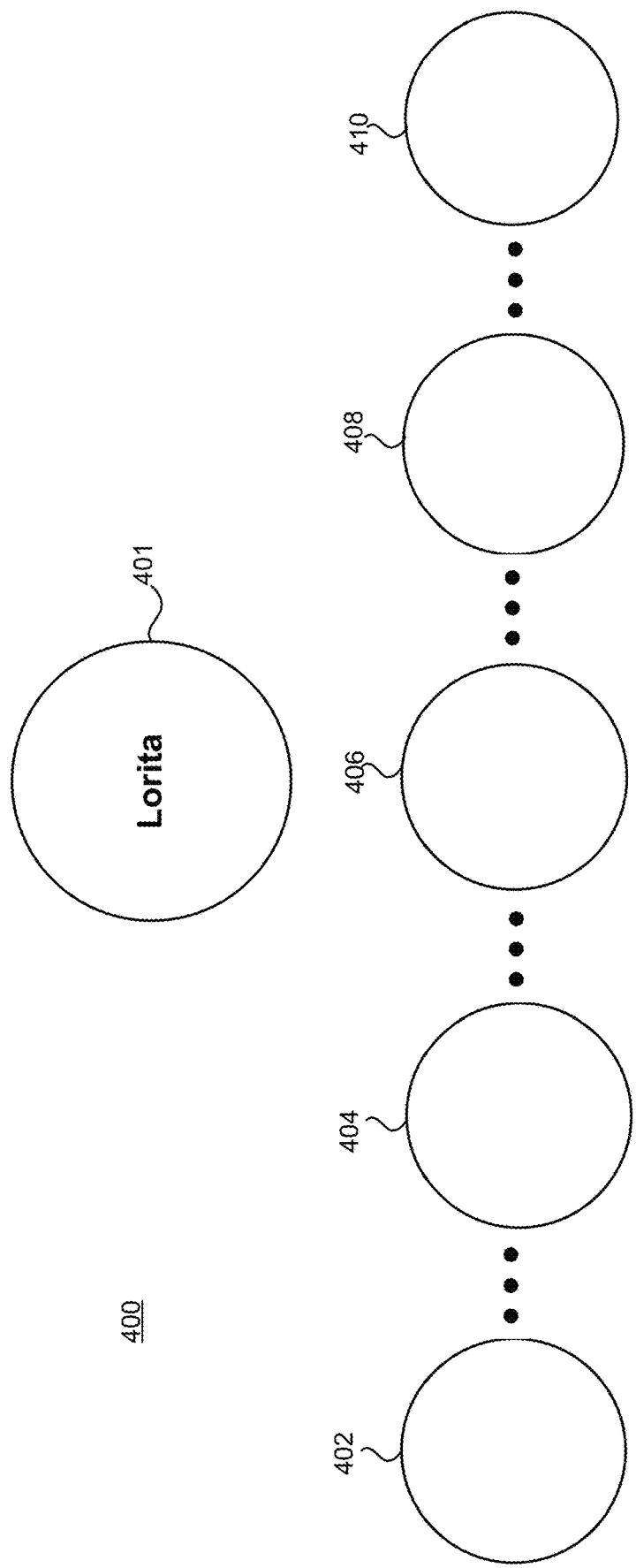
FIG. 4 depicts a storyboard for an example embodiment of a credentials verification process in accordance with at least certain techniques described in this disclosure.

FIG. 4 depicts a storyboard for an example embodiment of a credentials verification process 400 in accordance with at least certain techniques described in this disclosure. In this depicted embodiment, a user 401 "Lorita" is a 55-year-old who works at the registrar's office at Stanford University. At 402, Lorita is tasked with creating blockchain records for recent graduates in the class of 2016. At 404, Lorita goes to the student information system and selects all relevant students. In this example, Lorita updates each student's major/field of study, qualifications, and graduation year, etc., in the system. The credentials verification network (also referred to herein as "TrueRec") can be integrated with the system at Stanford used by Lorita, and at 406 all she has to do is click a button to submit the information. Afterwards, at 408 the verification network can be configured to generate the blockchain records for each student's graduation certificate automatically. As soon as this process is completed, at 410 Lorita can receive a notification that the records have been generated and each student can then receive a notification with their unique record.

Figure 5:
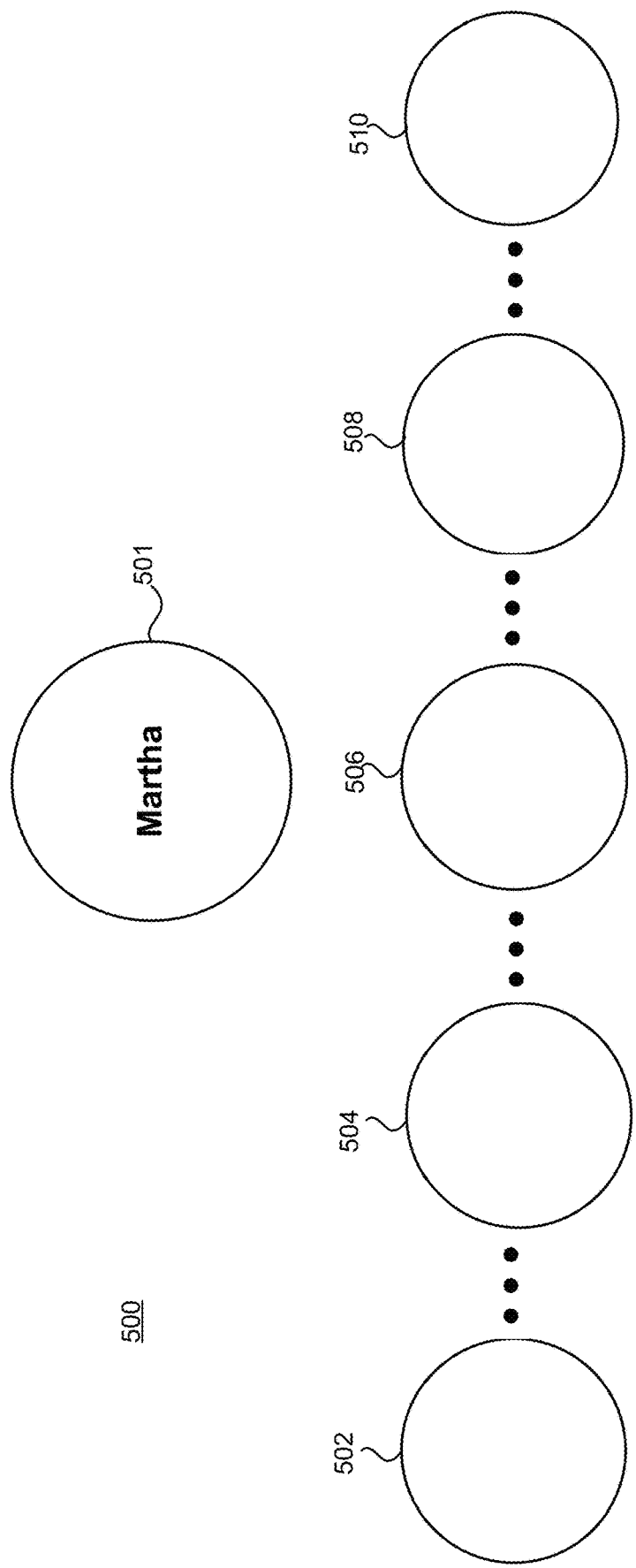
FIG. 5 depicts a storyboard for an example embodiment of a credentials verification process in accordance with at least certain techniques described in this disclosure.

FIG. 5 depicts a storyboard for an example embodiment of a credentials verification process 500 in accordance with at least certain techniques described in this disclosure. In this embodiment, Martha 501 is a 26-year-old applicant seeking a job. At 502 Martha graduates from university in 2016. At 504 Martha received a notification that her university certificate is verified on the verification network. At 506, in order to manage her verified records, Martha registers and creates a profile on the (TrueRec) network. After the profile is created and Martha's identity is verified, her graduation certificate can be stored in her digital profile on the verification network.

In this example, at 508 after her studies, Martha begins working at BMW. A year later, she decides it is time to learn something new and quits her job. At 510, BMW can then issue a certificate verifying her employment information on the network with all the relevant data relating to Martha's work at BMW.

Figure 6:
FIG. 6 depicts an example embodiment of a user profile for a credentials verification process in accordance with at least certain techniques described in this disclosure.

FIG. 6 depicts an example embodiment of a user profile for a credentials verification process in accordance with at least certain techniques described in this disclosure. In the illustrated embodiment, Martha's profile includes information about Martha such as name and date of birth. Martha's profile also includes her verification identifiers and corresponding institution names for each record stored in the blockchain. Martha's user profile also includes a file name (e.g., certificate, employment information, etc.) for each verified entry in the blockchain.

Figure 7:
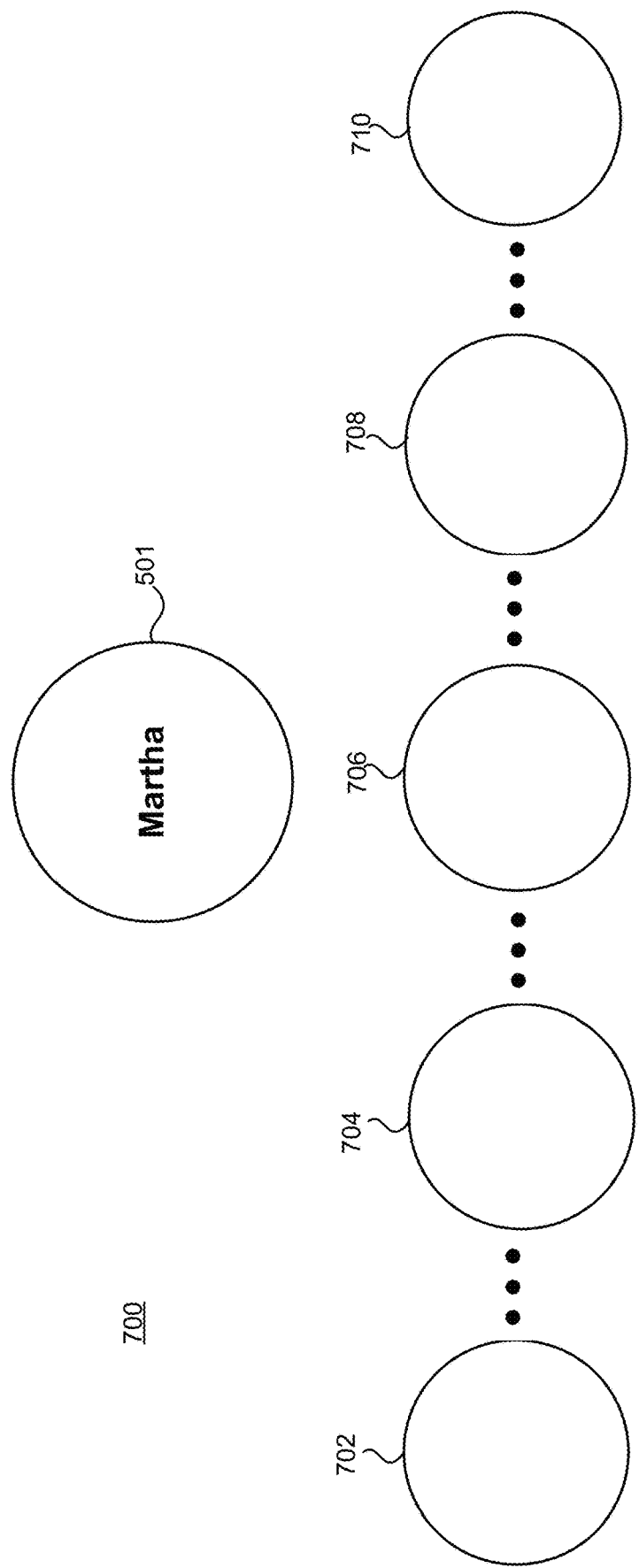
FIG. 7 depicts a storyboard for an example embodiment of a credentials verification process in accordance with at least certain techniques described in this disclosure.

FIG. 7 depicts a storyboard for an example embodiment of a credentials verification process 700 in accordance with at least certain techniques described in this disclosure. In the illustrated embodiment, at 702 Martha receives a notification that BMW has created a new record on the verification network. Since Martha is already a part of the blockchain, at 704 the record can be added to her digital profile as shown in FIG. 6. After searching for a job, at 706 Martha finds an amazing opportunity at a new company SAP. At 708 Martha then goes onto the network and selects the information that she wants to share with SAP in her job application. A few days later, at 710 Martha is invited for an interview at SAP, and her employment and other credentials information can be verified on the network before her interview commences.

Figure 8:
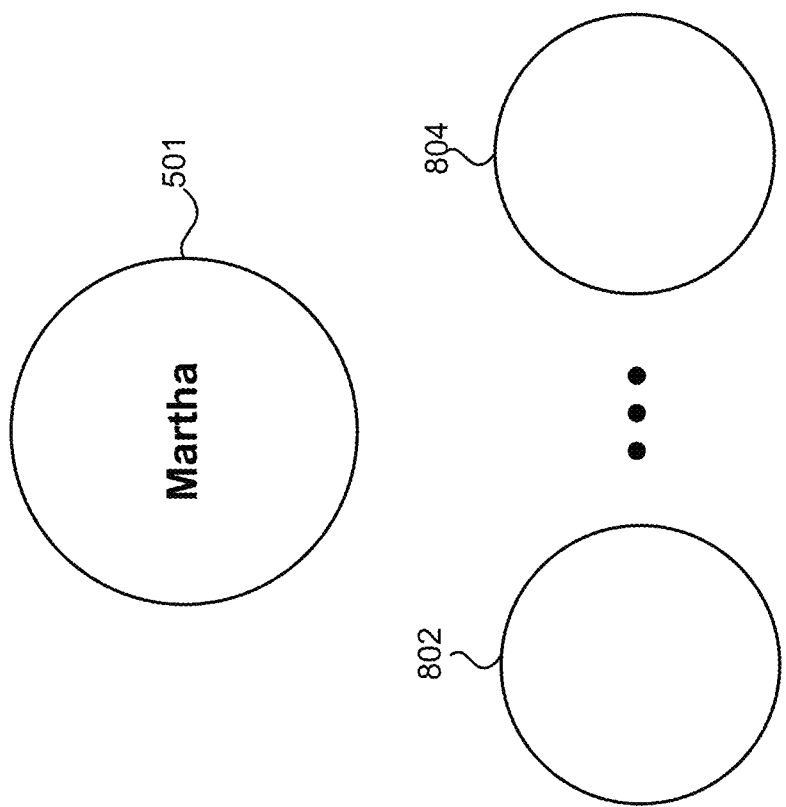
FIG. 8 depicts a storyboard for an example embodiment of a credentials verification process in accordance with at least certain techniques described in this disclosure.

FIG. 8 depicts a storyboard for an example embodiment of a credentials verification process 800 in accordance with at least certain techniques described in this disclosure. In the illustrated embodiment, at 802 a recruiter calls Martha to inform her that she got the job and that she can start work immediately. Since her academic and employment experience information were verified through the blockchain, at 804 the background check was significantly faster and she can start work immediately.

Figure 9:
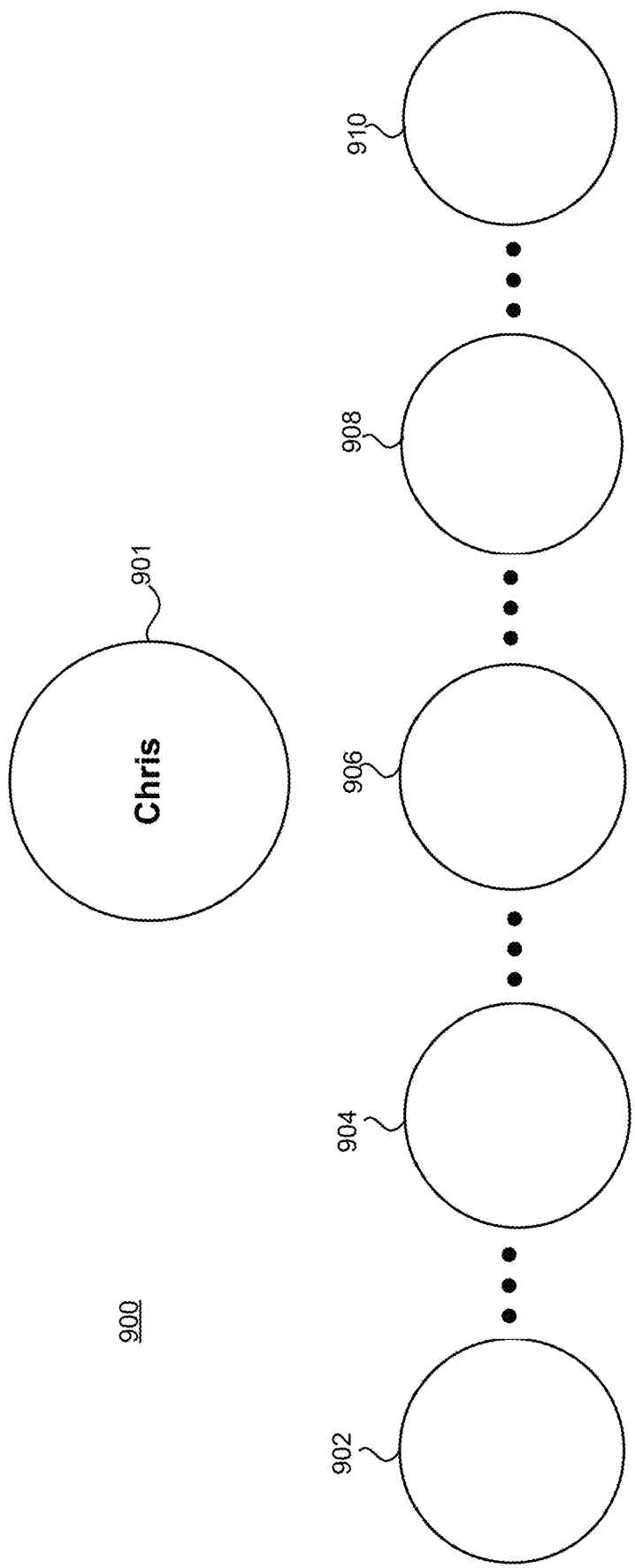
FIG. 9 depicts a storyboard for an example embodiment of a credentials verification process in accordance with at least certain techniques described in this disclosure.

FIG. 9 depicts a storyboard for an example embodiment of a credentials verification process 900 in accordance with at least certain techniques described in this disclosure. In the illustrated embodiment, Chris 901 is a 32-year-old early talent recruiter at SAP. At 902, Chris receives resumes for a position he is hiring for. He checks if the resumes include former employment and seven-year occupation history with positions held, as well as the duration of the positions held.

When a resume is verified by the network, at 904 Chris can pass it to the team for them to consider for an interview. At 906 the network can automatically verify the resume certification and transaction codes. At 908 the team can then interview the applicant and offer him or her a position. Chris can then skip the experience verification step and go directly to making an offer to the candidate. At 910 the applicant is then able to start on the day he or she executes the offer.

Figure 10:
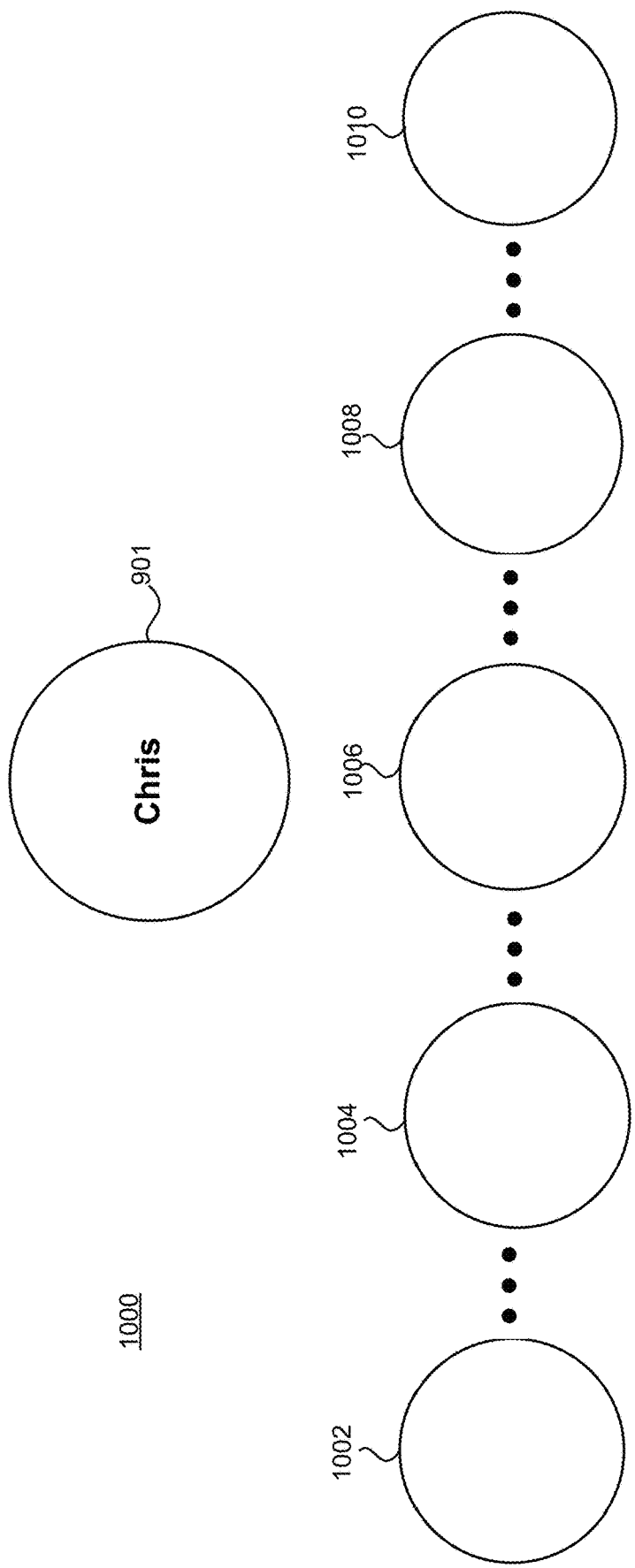
FIG. 10 depicts a storyboard for an example embodiment of a credentials verification process in accordance with at least certain techniques described in this disclosure.

FIG. 10 depicts a storyboard for an example embodiment of a credentials verification process 1000 in accordance with at least certain techniques described in this disclosure. In the illustrated embodiment, at 1002 Chris received a second resume that is only partially certified by the network. The applicant Sam has a very good background, and so Chris also passes this resume to the team for interviews. At 1004 Chris contacts Sam asking him to reach out to the unverified company and have them issue him a certificate. At 1006 Sam can then contact his previous employer and get them to issue a certificate on the network. At 1008 Sam can then receive his verified ID from his previous employer through the network. If his previous employer was not part of the network, they can also manually provide verification for Sam. At 1010 Sam can then resubmit his fully verified resume to Chris. The system can then verify the ID number given to SAP.

Figure 11:
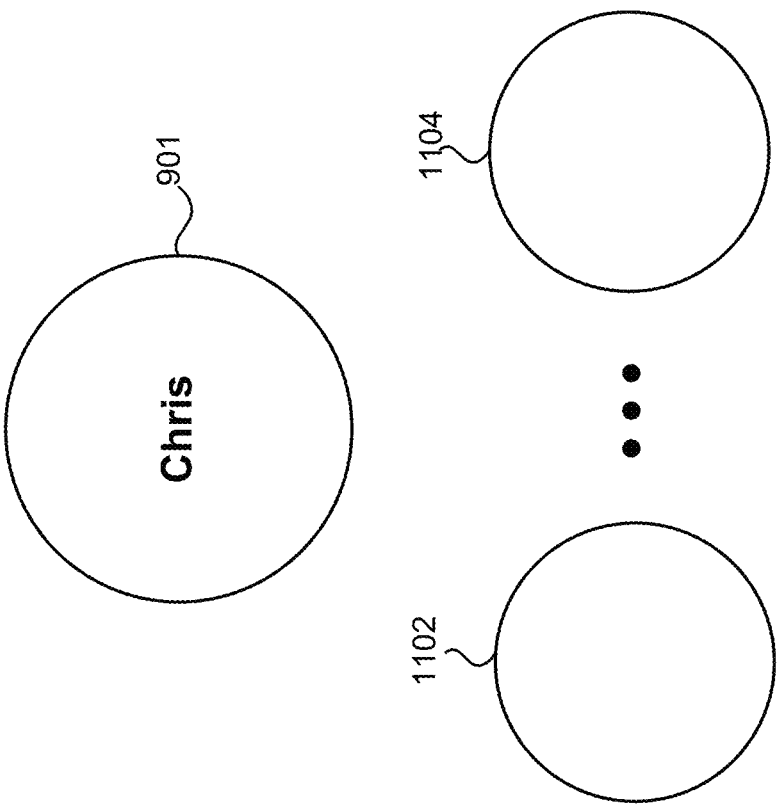
FIG. 11 depicts a storyboard for an example embodiment of a credentials verification process in accordance with at least certain techniques described in this disclosure.

FIG. 11 depicts a storyboard for an example embodiment of a credentials verification process 1100 in accordance with at least certain techniques described in this disclosure. In the illustrated embodiment, at 1102 Sam interviews with the team at SAP and is offered a position. At 1104 he can then start immediately after he accepts the offer.

II. Illustrative Hardware Implementation

Embodiments of the present disclosure may be practiced using various computer systems including hand-held devices, microprocessor systems, programmable electronics, laptops, tablets and the like. The embodiments can also be practiced in decentralized computing environments where tasks are performed by remote processing devices that are linked through one or more wire-based or wireless networks.

Figure 12:
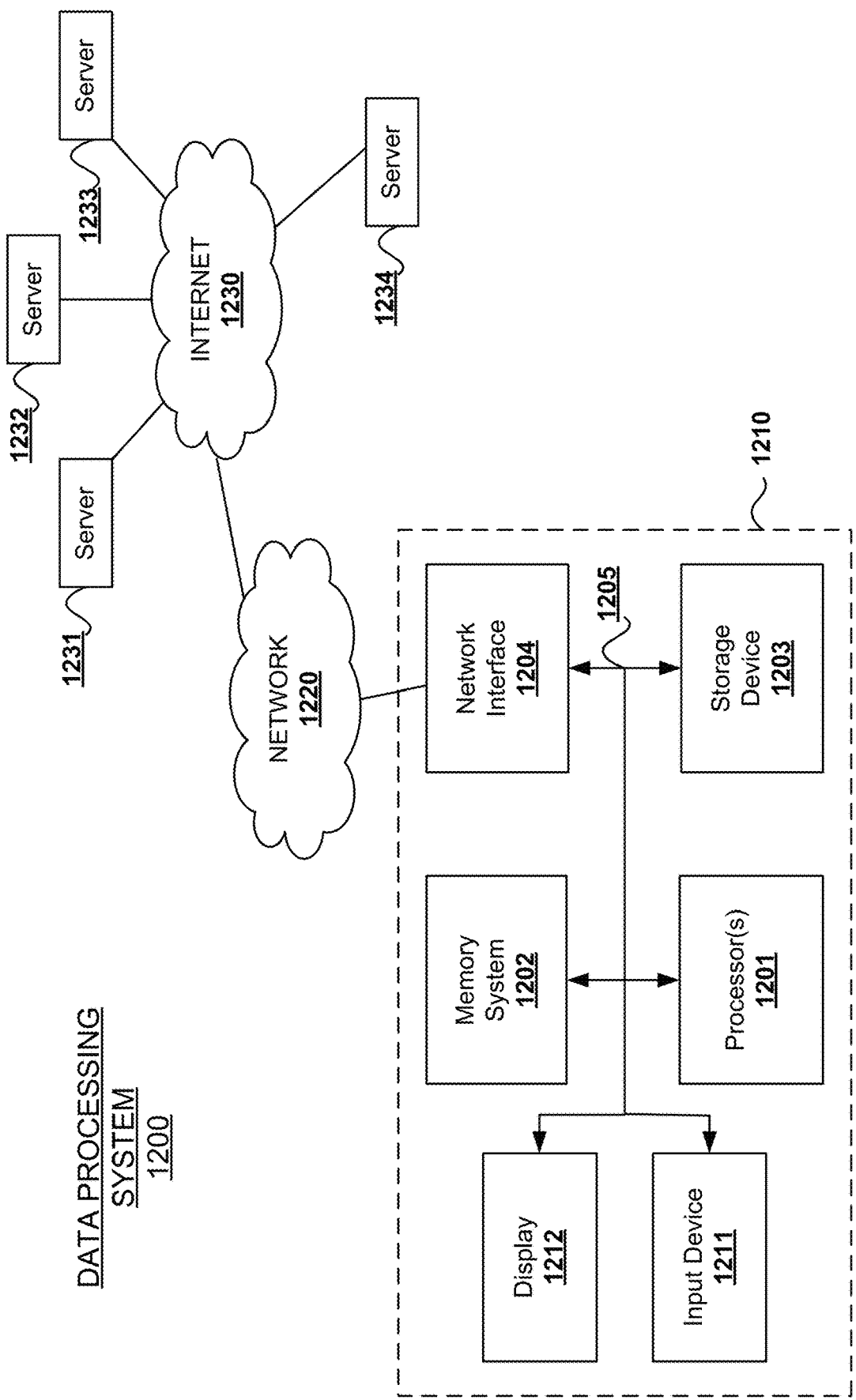
FIG. 12 depicts an example overview block diagram of a data processing system upon which the embodiments described in this disclosure may be implemented.

FIG. 12 depicts an example overview block diagram of a data processing system upon which the embodiments described in this disclosure may be implemented. The following hardware description is merely one example. It is to be understood that a variety of computers configurations may be used to implement the described techniques. While FIG. 12 illustrates various components of a data processing system 1200, it is not intended to represent any particular architecture or manner of interconnecting components. It will also be appreciated that network computers and other data processing systems, which have fewer components or additional components, may be used. The data processing system 1200 may, for example, comprise a personal computer (PC), workstation, laptop computer, tablet, smartphone or other hand-held wireless device, or any device having similar functionality.

In the illustrated embodiment, data processing system 1200 includes a computer system 1210. Computer system 1210 includes an interconnect bus 1205 (or other communication mechanism for communicating information) and one or more processor(s) 1201 coupled with the interconnect bus 1205 for processing information. Computer system 1210 also includes a memory system 1202 coupled with the one or more processors 1201 via the interconnect bus 1205. Memory system 1202 is configured to store information and instructions to be executed by processor 1201, including information and instructions for performing the techniques described above. This memory system may also be used for storing programs executed by processor(s) 1201. Possible implementations of this memory system may be, but are not limited to, random access memory (RAM), read only memory (ROM), or combination thereof.

In the illustrated embodiment, a storage device 1203 is also provided for storing information and instructions. Typically storage device 1203 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 1203 may store source code, binary code, or software files for performing the techniques above. In addition, while FIG. 12 shows that storage device 1203 as a local device connected with the components of the data processing system, it will be appreciated by skilled artisans that the described techniques may use a storage device remote from the system, such as a database or other network storage device coupled with the computer system 1210 through a network interface such as network interface 1204.

Network interface 1204 may provide communications between computer system 1210 and a network 1220. The network interface 1204 may be a wireless or wired connection, or any combination thereof. Computer system 1210 is configured to send and receive information through the network interface 1204 across one or more networks 1220 such as a local area network (LAN), wide-area network (WAN), wireless or Bluetooth network, or the Internet 1230, etc. Computer system 1210 may access data and features on systems residing on one or multiple different hardware servers 1231-1234 across the network 1220. Hardware servers 1231-1234 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 1210 may be coupled via interconnect bus 1205 to a display 1212 for displaying information to a computer user. An input device 1211 such as a keyboard, touchscreen, and/or mouse is coupled to bus 1205 for communicating information and command selections from the user to processor 1201. The combination of these components allows the user to communicate with the system. In some systems, bus 1205 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Returning to FIG. 3, that figure shows implementation of credential verification utilizing a generalized blockchain network. However, embodiments are not limited to such approaches and alternatively could utilize a blockchain accommodating smart contract features.

Figure 13:
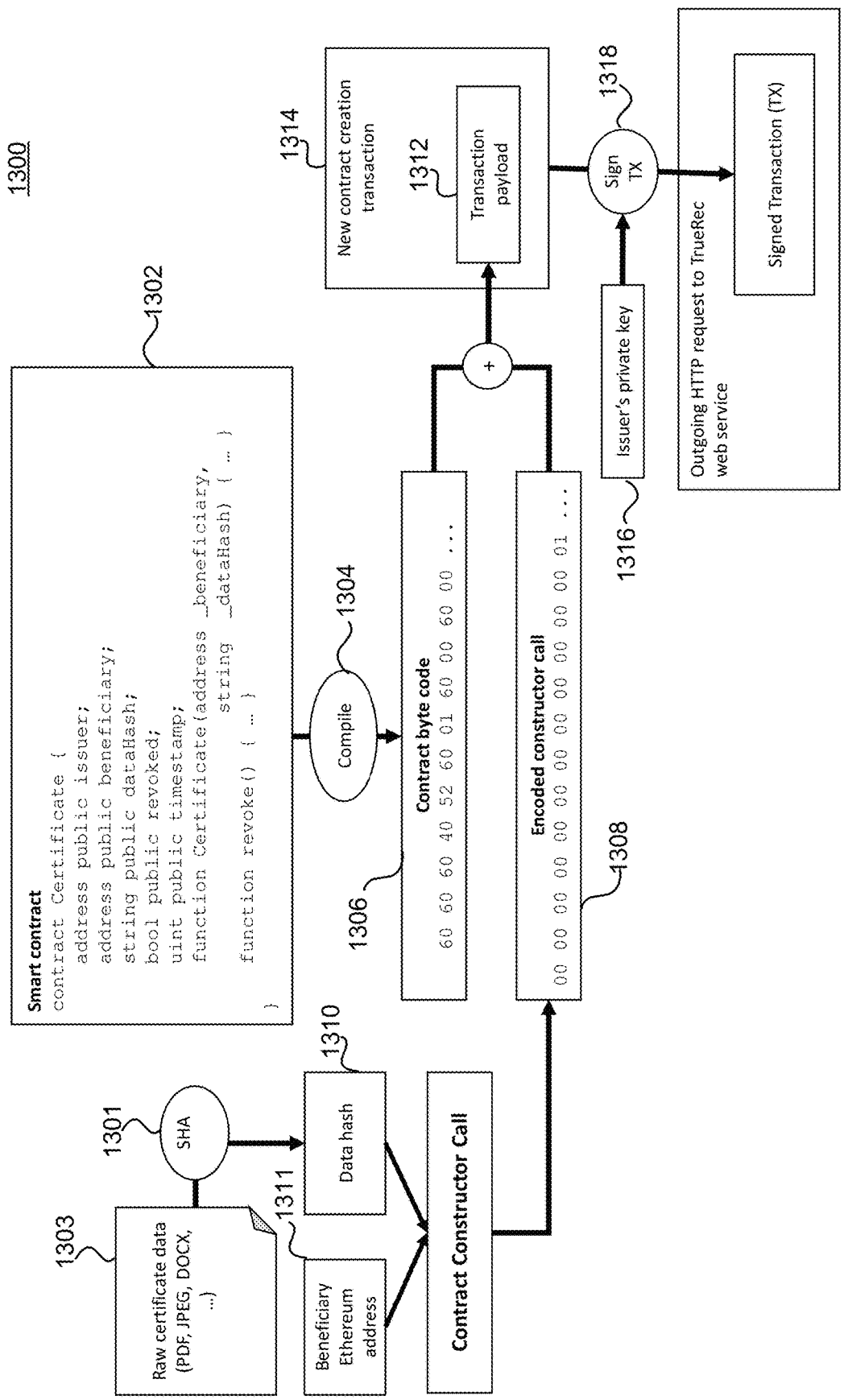
FIG. 13 illustrates an alternative embodiment utilizing a blockchain network featuring smart contract features.

Accordingly, FIG. 13 shows an alternative embodiment 1300 utilizing an ETHEREUM smart contract blockchain network. In particular, the structure of the embodiment of FIG. 13 parallels that of FIG. 3, in that it includes application of a secure hash algorithm 1301 to certificate data 1303. The raw certificate data may be in portable document format (PDF), JPEG, DOCX, a JSON string, or other forms.

The system of FIG. 13, however, further includes a smart contract component 1302 that is compiled 1304 to generate a contract byte code 1306. The smart contract component comprises a series of executable statements—e.g., in JavaScript Object Notation (JSON) that contribute enhanced functionality in addition to standard blockchain features.

For example, the smart contract component may include specific terms and executable logic recognizing and/or enforcing specific contractual concepts including but are not limited to:
 issuer;
 beneficiary;
 conditions;
 expiration;
 revocation; and
 others.

Compiling of the smart contract component may result in the generation of the contract byte code 1306. As shown in the figure, that contract byte code is combined with the encoded constructor call 1308 generated as a result of the hashing of the raw certificate data 1310 together with the ETHEREUM address 1311 of the beneficiary. Here, the hash of the raw certificate data represents the fingerprint discussed above.

The combining of the contract byte code with the encoded constructor call results in creation of a transaction payload 1312 of a new contract transaction 1314. Further processing with the private key of the issuer 1316 results in a signed transaction 1318.

Figure 14:
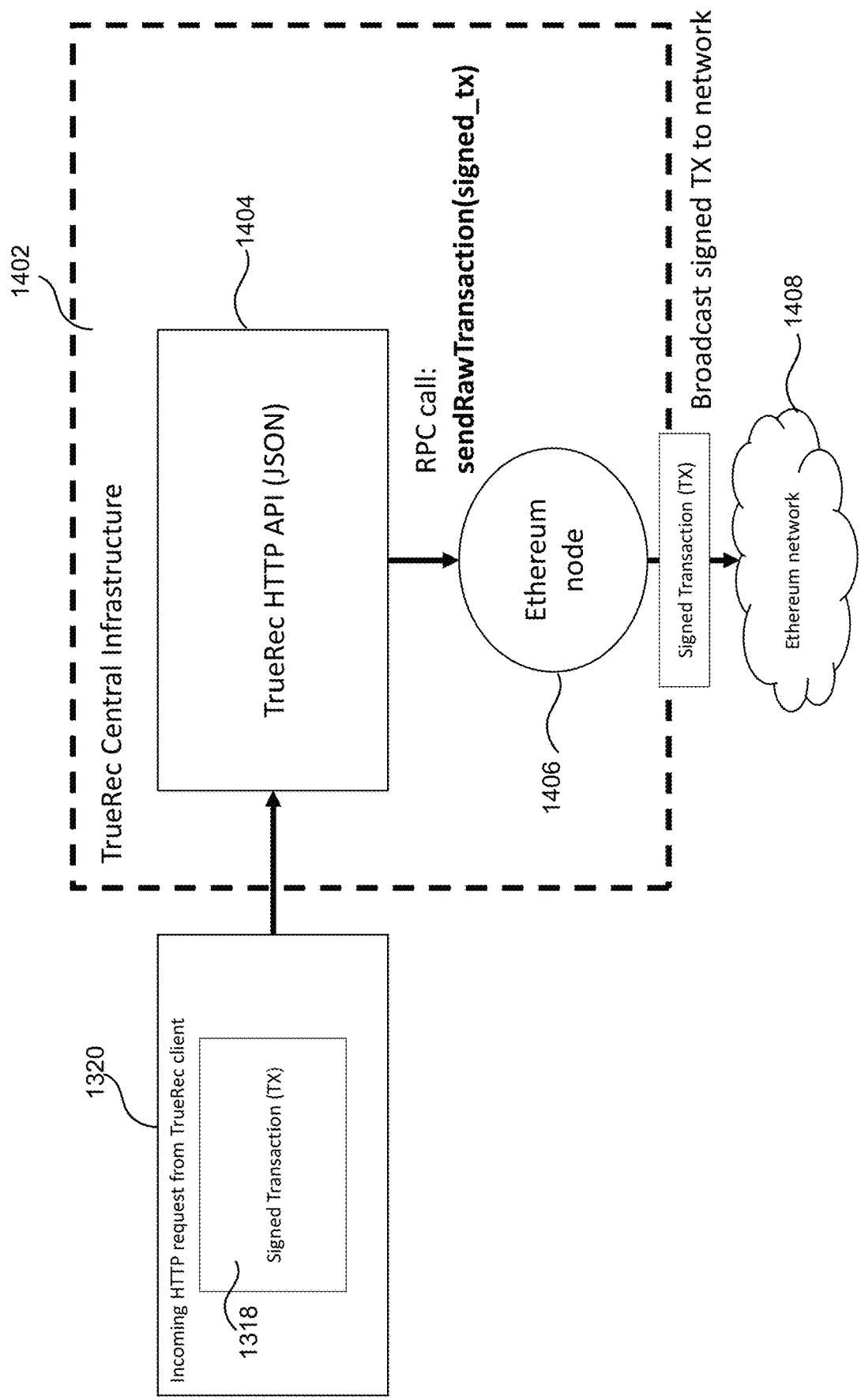
FIG. 14 illustrates processing to add a new transaction to a blockchain network featuring smart contract features.

FIG. 13 concludes with the communication of that signed transaction as part of an outgoing HTTP request 1320 to a remote web service (e.g., the TrueRec web service available from SAP SE). FIG. 14 provides details regarding processing to add the new transaction to the ETHEREUM blockchain network.

In particular, FIG. 14 shows the HTTP request 1320 including the signed transaction 1318, incoming to the central infrastructure 1402 of the TrueRec web service from the TrueRec client. The HTTP request is received at the application program interface (API) 1404, which initiates a Remote Procedure Call (RPC) to send the signed transaction to the node 1406 of the ETHEREUM blockchain network 1408 which features smart contract functionality.

As shown in the figure, the ETHEREUM node in turn broadcasts the signed transaction to the ETHEREUM network to allow for downstream further processing by other nodes. That processing may include enforcement of smart contract terms as has been described above.

The blockchain network accepts the transaction utilizing a consensus mechanism. Examples of such consensus mechanisms can include but are not limited to:
 mining; and
 proof of work.

The candidate is then notified of the acceptance of the transaction by the blockchain network. The candidate is provided with the raw text document and transaction receipt ID.

The candidate can now forward this information to a recruiter or potential employer running a second node on the distributed blockchain network. That second node will regenerate the fingerprint, and lookup the fingerprint stored in the blockchain network, using the transaction receipt identifier. Accordingly, verification of the candidate's credentials can be accomplished in a decentralized manner.

It is noted that certain embodiments may be suited for implementation in connection with an in-memory database. One example of such an in-memory database engine is that of the HANA in-memory database available from SAP SE of Walldorf, Germany.

Figure 15:
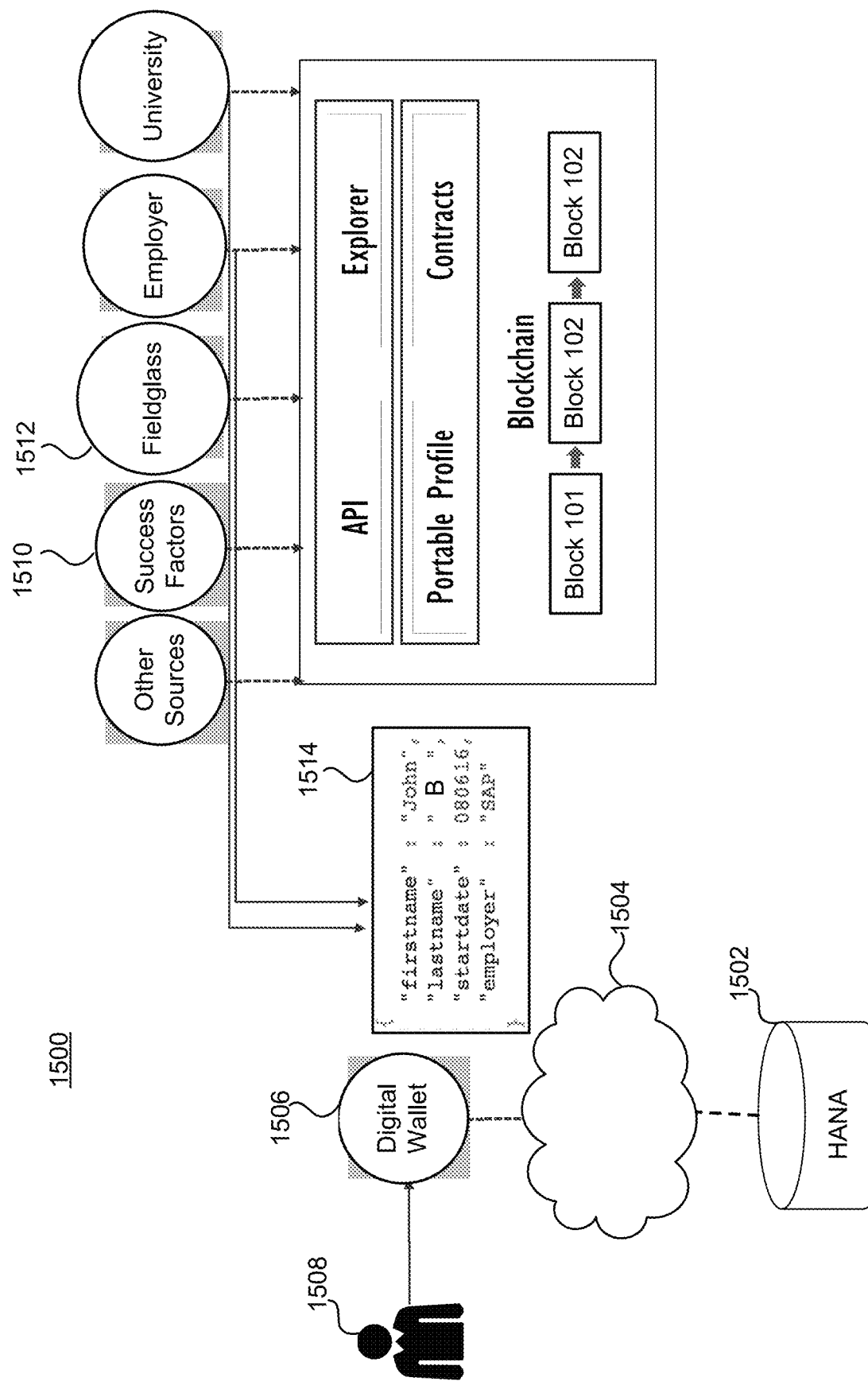
FIG. 15 illustrates specific embodiment of a system implemented in conjunction with an in-memory database.

FIG. 15 illustrates an embodiment of a system 1500 for credential verification implemented with a HANA in-memory database 1502. In particular, HANA is used as off chain data storage, and accessed via network 1504 by a digital wallet 1506 of end user 1508.

Some of the hashing and signing capabilities may be inbuilt in particular applications with which HANA is compatible. Examples of such applications include the SAP SUCCESSFACTORS human resources platform 1510 storing data of employees, as well as the SAP FIELDGLASS 1512 vendor management platform storing data of contractors and contingent workers.

Such configurations may ease the integration with background check process. For example, SUCCESSFACTORS and FIELDGLASS may only have to pass the signed certificate and store the transaction identifier for the end user.

Accordingly, FIG. 15 shows the return of certification data to the end user's digital wallet in the form of a JSON string 1514. Rapid communication of the certification data in a specific desired form may be expedited by the system's recognition of pre-existing identifier information that is already an inherent part of the SUCCESSFACTORS employee management software.

Also, the ability of the pre-existing application to automatically provide raw certification data in a particular format (e.g., JSON string), may further lighten the processing burden imposed upon the thin client of the end user's portable device that is hosting the digital wallet.

The SUCCESSFACTORS and/or FIELDGLASS applications may also act as a key storage, storing the key in a secure way. This may avoid the need for employers and/or academic institutions to separately maintain and secure key pairs.

The high storage capacity of HANA may be leveraged to persist large volumes of user and/or credential data. In-memory capabilities can help to transact faster verification processes. Moreover, the predictive and machine learning capacities of HANA may be employed to enhance identity verification technology.

While the above description has focused upon embodiments useful for decentralized verification of education and work history credentials, embodiments are not limited to this particular context. Other embodiments could employ a blockchain in order to provide verification of other information, for example that used for ● identity checks, ● credit checks, and ● criminal record checks. In this regard, the application of a security feature (e.g., hashing) may function to limit the scope of dissemination of the actual underlying sensitive original data—e.g., government identification number (social security no., passport no., etc.), financial account nos., thereby reducing the opportunity for misappropriation by a third party.

Certain embodiments may relate to a method comprising, in a system in a network comprising one or more computing devices in communication with one or more database systems configured to perform operations as shown and described in this disclosure.

Some embodiments relate to a system comprising, a network comprising one or more computing devices in communication with one or more database systems, the one or more computing devices comprising at least one processor and a memory configured to store programmed computer code executable by the processor to perform operations as shown and described this disclosure.

Various embodiments relate to a non-transitory computer readable storage medium storing programmed computer code executable by a computer system in a network comprising one or more computing devices in communication with one or more database systems, the computer code configured to perform operations as shown and described in this disclosure.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A computer-implemented method comprising:
   receiving, at a first node in a computer network, a secure digital credential generated from an original credential document, the secure digital credential is a hash of the original credential document;
   compiling, at the first node in the computer network, a smart contract component into contract byte code;
   combining, at the first node in the computer network, the contract byte code and the secure digital credential to create a transaction;
   signing, at the first node in the computer network, the transaction with a key to create a transaction signature;
   communicating, by the first node in the computer network, the transaction and the transaction signature for storage as a block in a blockchain; and
   verifying, at a second node in the computer network, the secure digital credential by regenerating the hash and looking up the hash in the blockchain.

2. A method as in claim 1 wherein the transaction comprises a contract term from the smart contract component.

3. A method as in claim 2 wherein the contract term is compiled from source code of the smart contract component.

4. A method as in claim 2 wherein the contract term comprises a revocation.

5. A method as in claim 1 wherein the transaction comprises a hash of an assigned identifier.

6. A method as in claim 1 wherein the secure digital credential is provided based upon recognition of a user identifier by a pre-existing application.

7. A method as in claim 6 wherein the secure digital credential is provided in a format dictated by the user identifier.

8. A method as in claim 7 wherein the format comprises JavaScript Object Notation (JSON).

9. A method as in claim 1 further comprising storing the original credential document.

10. A method as in claim 1 wherein the original credential document comprises an academic transcript or an employment record.

11. A method as in claim 1 wherein the first node hashes the original credential document into the secure digital credential.

12. A non-transitory computer readable storage medium embodying a computer program for performing a method, said method comprising:
   receiving, at a first node in a computer network, a secure digital credential generated from an original credential document comprising an academic transcript or an employment record, the secure digital credential is a hash of the original credential document;
   compiling, at the first node in the computer network, a smart contract component into contract byte code;
   combining, at the first node in the computer network, the contract byte code and the secure digital credential to create a transaction;
   signing, at the first node in the computer network, the transaction with a key to create a transaction signature; and
   communicating, by the first node in the computer network, the transaction and the transaction signature for storage as a block in a blockchain; and
   verifying, at a second node in the computer network, the secure digital credential by regenerating the hash and looking up the hash in the blockchain.

13. A non-transitory computer readable storage medium as in claim 12 wherein the transaction comprises a contract term compiled from the smart contract component.

14. A non-transitory computer readable storage medium as in claim 12 wherein the secure digital credential is provided based upon recognition of a user identifier by a pre-existing application.

15. A non-transitory computer readable storage medium as in claim 14 wherein the secure digital credential is provided in a format dictated by the user identifier.

16. A non-transitory computer readable storage medium as in claim 12 wherein the first node hashes the original credential document into the secure digital credential.

17. A computer system comprising:
   one or more processors;
   a software program, executable on said computer system, the software program configured to cause a distributed network node to:
   receive, at a first node in a computer network, a secure digital credential generated from an original credential document, the secure digital credential is a hash of the original credential document;
   compile, at the first node in the computer network, source code from a smart contract component to produce a contract byte code for a contract term;
   combining, at the first node in the computer network, the contract byte code and the secure digital credential to create a transaction;
   sign, at the first node in the computer network, the transaction with a key to create a transaction signature; and
   communicate, by the first node in the computer network, the transaction and the transaction signature for storage as a block in a blockchain recognizing the contract term; and
   verifying, at a second node in the computer network, the secure digital credential by regenerating the hash and looking up the hash in the blockchain.

18. A computer system as in claim 17 wherein the original credential document comprises an academic transcript or an employment record.

19. A computer system as in claim 17 wherein the secure digital credential is provided based upon recognition of a user identifier by a pre-existing application.

20. A computer system as in claim 17 wherein the first node hashes the original credential document into the secure digital credential.

\* \* \* \* \*